United States Patent
Najbar et al.

(10) Patent No.: US 9,162,216 B2
(45) Date of Patent: Oct. 20, 2015

(54) CATALYST FOR DIRECT DECOMPOSITION OF NITRIC OXIDE AND METHOD OF MANUFACTURING THE CATALYST

(75) Inventors: Mieczyslawa Najbar, Kraków (PL); Jaroslaw Dutkiewicz, Kraków (PL); Aleksandra Weselucha, Kraków (PL); Józef Camra, Kraków (PL); Stanislaw Janiga, Osiek Jasielski (PL); Iga Nazarczuk, Belzec (PL); Mateusz Kozicki, Zawiercie (PL); Pawel Kornelak, Kraków (PL); Wieslaw Lasocha, Kraków (PL); Alicja Lasocha, Mogilany (PL)

(73) Assignee: UNIWERSYTET JAGIELLONSKI, Cracow (PL)

( * ) Notice: Subject to any disclaimer, the term of this patent is extended or adjusted under 35 U.S.C. 154(b) by 0 days.

(21) Appl. No.: 13/825,456
(22) PCT Filed: Aug. 8, 2012
(86) PCT No.: PCT/PL2012/000065
   § 371 (c)(1),
   (2), (4) Date: Jun. 7, 2013
(87) PCT Pub. No.: WO2013/022359
   PCT Pub. Date: Feb. 14, 2013

(65) Prior Publication Data
   US 2013/0244866 A1    Sep. 19, 2013

(30) Foreign Application Priority Data
   Aug. 8, 2011 (PL) .......................... 395905

(51) Int. Cl.
   B01J 8/00 (2006.01)
   B01J 23/00 (2006.01)
   (Continued)

(52) U.S. Cl.
   CPC ......... B01J 23/8892 (2013.01); B01D 53/8628 (2013.01); B01J 23/005 (2013.01);
   (Continued)

(58) Field of Classification Search
   CPC ........ C01B 21/00; C01B 21/24; B01D 53/56; B01D 53/86; B01D 53/8628; B01D 53/9413; Y10S 148/003; B01J 8/00; B01J 23/00; B01J 23/70; B01J 23/74; B01J 23/005; B01J 23/26; B01J 23/34; B01J 37/08
   USPC ................ 502/337, 338, 524; 423/235, 239.1
   See application file for complete search history.

(56) References Cited

U.S. PATENT DOCUMENTS 3,711,382 A * 1/1973 Anthony ......................... 205/80
3,810,754 A   5/1974 Ford et al.
(Continued)

FOREIGN PATENT DOCUMENTS

DE   2200507   7/1972
GB   1511841   5/1978
(Continued)

OTHER PUBLICATIONS

Mondt James R, "NOx Catalyst Performance Comparison of 304 Stainless Steel, Inconel, and Monel In a 10 Degree—Herringbone Foil Configuration", Aiche Symposium Series, American Institute of Chemical Engineers, New York, NY, US, , No. 165, Jan. 1975, pp. 169-177.
(Continued)

*Primary Examiner* — Patricia L Hailey
(74) *Attorney, Agent, or Firm* — Gary J. Gershik; Cooper & Dunham LLP

(57) ABSTRACT

The oxide catalyst for the direct NO decomposition to N2 and O2 is deposited on the austenitic acid-proof steel substrate and contains the phase with aFe2O3 structure and the phase with spinel structure and the lattice parameters close to the lattice parameters of NiFe2O4. Those phases form the micro-crystallites that additionally contain Cr and Mn and eventually Si. The catalyst according to the invention is manufactured by the at least twice heating of the austenitc acid-proof steel substrate in the atmosphere containing oxygen, up to the temperature from the 600-850° C. range, with the rate of 2-6° C./min, followed by the annealing at that temperature for 2-6 hours.

13 Claims, 4 Drawing Sheets

(51) Int. Cl.
| | |
|---|---|
| B01J 23/70 | (2006.01) |
| B01J 23/74 | (2006.01) |
| B01J 23/26 | (2006.01) |
| B01J 23/34 | (2006.01) |
| B01J 37/08 | (2006.01) |
| C01B 21/00 | (2006.01) |
| C01B 21/24 | (2006.01) |
| B01D 53/56 | (2006.01) |
| B01D 53/86 | (2006.01) |
| B01J 23/889 | (2006.01) |
| B01J 37/02 | (2006.01) |
| B01J 37/14 | (2006.01) |
| B01J 23/755 | (2006.01) |
| B01J 23/86 | (2006.01) |
| C23C 8/14 | (2006.01) |
| C23C 8/80 | (2006.01) |

(52) U.S. Cl.
CPC .......... *B01J 23/755* (2013.01); *B01J 23/866* (2013.01); *B01J 37/0226* (2013.01); *B01J 37/14* (2013.01); *C23C 8/14* (2013.01); *C23C 8/80* (2013.01); *B01D 2255/2073* (2013.01); *B01D 2255/20738* (2013.01); *B01D 2255/20753* (2013.01); *B01D 2255/20784* (2013.01); *B01D 2255/30* (2013.01); *B01D 2255/80* (2013.01); *B01D 2257/404* (2013.01); *B01J 2523/00* (2013.01)

(56) References Cited

U.S. PATENT DOCUMENTS

| | | | |
|---|---|---|---|
| 4,001,371 A * | 1/1977 | Remeika et al. | 423/213.2 |
| 4,017,336 A | 4/1977 | Foroulis | |
| 4,021,372 A | 5/1977 | Meguerian et al. | |
| 4,143,120 A * | 3/1979 | Sermon | 423/239.1 |
| 4,228,138 A | 10/1980 | Sermon | |
| 5,589,147 A * | 12/1996 | Farnos et al. | 423/239.2 |
| 2003/0036477 A1 * | 2/2003 | Nordquist et al. | 502/527.19 |

FOREIGN PATENT DOCUMENTS

| | | | |
|---|---|---|---|
| JP | 8038902 | 2/1996 | |
| WO | 2013/022359 * | 2/2013 | ............ B01D 53/86 |

OTHER PUBLICATIONS

International Search Report issued by the International Searching Authority (ISA/O.E.P.M.) on Dec. 18, 2012 in connection with International Application No. PCT/2012/000065.
Written Opinion Of The International Searching Authority for PCT/PL2012/000065, dated Feb. 8, 2014.
International Preliminary Report on Patentability for PCT/PL2012/000065, dated Feb. 11, 2014.
Communication Pursuant to Rules 161(1) and 162 EPC issued on Mar. 20, 2014 by the European Patent Office in connection with European Patent Application No. 12766727.7.
Amendment In Response to Mar. 20, 2014 Communication filed with the European Patent Office on Sep. 19, 2014 in connection with European Patent Application No. 12766727.7.
Invitation to File Search Results issued on Nov. 10, 2014 by the European Patent Office in connection with European Patent Application No. 12766727.7.
Response to Nov. 10, 2014 Invitation filed with the European Patent Office on Nov. 18, 2014 in connection with European Patent Application No. 12766727.7.
D. Reichert et al. "Recent advances in the understanding of the direct conversion of soot and NO on Ee2O3 catalyst in diesel exhaust" chimica oggi/Chemistry Today; 28(1); 2010, pp. 51-53.
E. Kasai et al. "Catalytic Performance of Several Metallic Oxides on The Elimination Reactions of NO" 1997, pp. 62-69.

* cited by examiner

CATALYST FOR DIRECT DECOMPOSITION OF NITRIC OXIDE AND METHOD OF MANUFACTURING THE CATALYST

This application is a §371 national stage of PCT International Application No. PCT/PL2012/000065, filed Aug. 8, 2012, designating the United States and claiming priority of Polish Patent Application PL 395905, filed Aug. 8, 2011, the contents of all of which are hereby incorporated by reference into this application.

The subject of the present invention is a catalyst for direct NO decomposition to $N_2$ and $O_2$. This catalyst is designed for nitric oxide removal from tail-gases of stationary sources of emission, such as: power plants, heat and power plants, waste incinerators, nitric acid factories, boilers of small and medium power, Diesel engines.

$DeNO_x$ technology is used nowadays for the nitric oxide removal from tail-gases of the stationary sources of emission. The technology is based on NO reduction by ammonia ((Catal. Today 62 (2000) 51-65 P. Forzatti et al.). The new patents concerning this technology still appear (ex. JP 2010-214306).

However, ammonia is relatively expensive and corrosive reducer, demanding costly dosage systems, and moreover, it itself is the air pollutant effecting harmfully human respiratory system.

Monolithic vanadium-tungsten oxide catalysts on ceramic supports, commonly used in this process, frequently undergo blocking by the soot forming in the burning processes, containing inorganic and carbon components. Moreover, the ceramic supports are relatively fragile. It may cause mechanical damage of the surface parts of the catalyst, responsible for its activity. In addition, selective interaction of particular components of the ceramic support with the reaction gases causes its cracking and deforming during long-lasting use.

The use of the direct NO decomposition for the NO removal from tail-gases of the stationary sources of emission does not require any reducer and thus, any system for its dosage, that make the process cheaper and environmentally-friendly.

The authors of the numerous patents have proposed for the direct NO decomposition: precious metals on oxide supports (US 20060073964, US 20070025901), silver or silver oxide on the oxide support (EP526099, EP679427), and mixed oxides containing transition metals in the hydrotalcite structure (KR 101011830).

The NO decomposition in the presence of the reducing agents on the mixed oxide catalysts with spinel structure (JP 7284663, JP 10180105) and the direct NO decomposition on the mixed V-W oxide catalysts (PL199013) were proposed earlier.

The direct NO decomposition on the soot, with the participation of the oxygen activated on $\alpha\ Fe_2O_3$ (Applied Catalysis B: Environmental 80 (2008) 248-259 D. Reichert et al., Applied Catalysis B: Environmental 84 (2008) 803-812 D. Reichert et al.) and on metallic iron (Chemical Engineering Science, 53 (1998) 1481-1489 A. N. Hayhurst et al. and Fuel 89 (2010) 3505-3509 B. Gradoń et al.) was suggested recently.

A big drawbacks of the proposed catalysts is the low rate of the direct NO decomposition and the drop of the selectivity to nitrogen—caused by the oxygen presence, the destruction of the catalyst structure, under the influence of the water present in tail-gases, in the case of zeolites, as well as the gradual loss of the activity of the catalysts as a result of the soot deposition. Therefore none of the proposed catalysts have been commercialized till now.

DETAILED DESCRIPTION OF THE INVENTION

Figure 1:
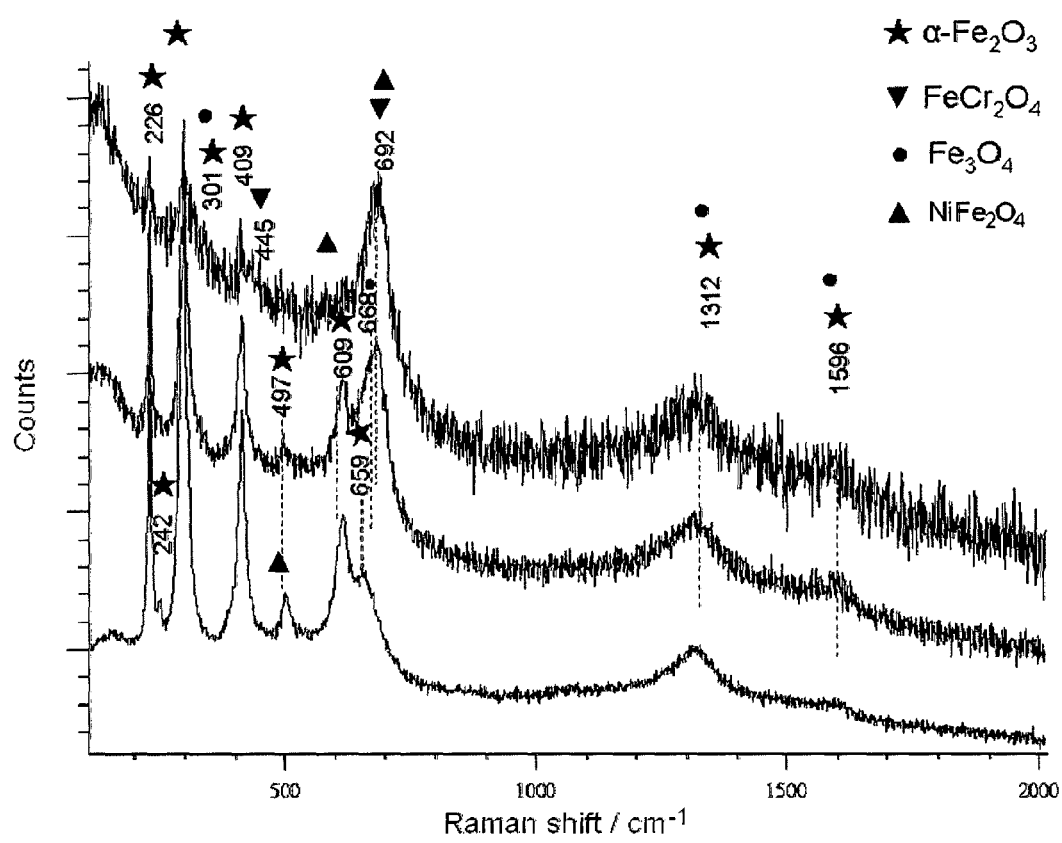
FIG. 1 shows Raman spectra in the 100-2000 $cm^{-1}$ wave number range of three samples taken from a powdered catalyst prepared according to Example 1.

The oxide catalyst for the direct NO decomposition to $N_2$ and $O_2$ on the austenitic acid-proof steel substrate, according to invention, contains the phase with the $\alpha Fe_2O_3$ structure and the phase with the with spinel structure having lattice parameters the nearest to to the lattice parameters of the nickel-iron spinel $NiFe_2O_4$ Those phases form microcrystallites that contain additionally Cr and Mn and eventually Si. In the phase with $NiFe_2O_4$ structure concentration of Cr and Mn are equal to 3.6-8.8 at. % and 1.4-3.4 at. %, respectively and in the phase with $\alpha$-$Fe_2O_3$ structure the concentration of Cr, Mn and Si are equal to 0.1-1.7 at. %, 0.1-0.3 at. % and 0-0.2 at. %, respectively.

The content of the spinal phase with lattice parameters the close to the $NiFe_2O_4$ lattice parameters, determined from the average EDS data with assumption that Ni occurs only as $Ni^{2+}$, Cr as $Cr^{3+}$ is equal to 29-36 wt. % and the content of the phase with $\alpha\ Fe_2O_3$ structure is equal to 64-72 wt. %.

Preferably in the phase with $\alpha Fe_2O_3$ structure no more than 1.5% of $Fe^{3+}$ ions is substituted by $Cr^{3+}$, whereas in $NiFe_2O_4$ structure no more than 12% of $Fe^{3+}$ ions is substituted by $Cr^{3+}$ ions and no more than 10% $Ni^{2+}$ ions is substituted by $Mn^{2+}$ ions. The The austenitic steel substrate occurs in the form of tubes, stripes and monoliths made of the foil and it is prepared from Cr—Ni steel, possibly with addition of Ti.

Preferably the steel containing no more than 0.1 wt. %of C, 2.0 wt.% of Mn, 0.8 wt. % of Si, 0.045 wt. % of P, 0.03wt. % of % S, 0.3% wt. % of Cu, 19.0 wt. %of Cr, 10.0wt. % of Ni and 0.8 wt. % of % Ti is used. The most preferably the austenitic1H18N9T/1.4541 steel is applied.

Preferably the specific surface area of the catalyst is equal 1 to 5 $m^2$/g.

The oxide catalyst according to the present invention is manufactured directly on the acid-proof austenitic steel substrate by its oxidation in the atmosphere containing oxygen during at least twice heating of the austenitic acid-proof steel monolith to 600-850° with the rate of 2-6° C./min, followed by the next annealing at those temperatures for 2-6 hours.

Preferably the steel is heated in air atmosphere.

Preferably the steel is heated 2-10 times.

Preferably the austenitic steel substrate has the shape of stripes, tubes or monoliths made from the foil.

As a result of the heating of the austenitic acid-proof steel substrate, the catalyst according to the present invention, containing oxide phases strongly bound with the substrate, is formed.

Two-phase catalyst on the acid proof austenitic steel substrate shows: the high activity in the direct NO decomposition, the small change in the selectivity to nitrogen under the oxygen influence and the time stability of both the catalytic parameters.

The catalyst causes oxidation of the carbon from the soot that ensure its stable activity. The thin coatings of the oxide catalyst, according to the invention, formed on the channel walls of monolith as epitaxial layers, do not undergo chipping and protect the metallic substrate against further corrosion.

The very simple manufacturing and the low cost are the additional assets of the proposed catalysts on the acid proof austenitic steel substrate.

The structure of the oxide layers on the acid proof austenitic steel substrate was determined by the X-ray diffraction, electron diffraction and Raman spectroscopy. Their chemical composition was determined by X-ray spectroscopy and X-ray photoelectron spectroscopy (XPS). The samples for those investigations were obtained by scraping the catalyst off the surface from the oxidized tubes or pieces of the foil.

The content of the spinel phase with the lattice parameters the close to the lattice parameters of the $NiFe_2O_4$ 1 was evaluated on the base of the statistics of the indexed selected area diffraction patterns as well as on the base of the X-ray diffraction patterns and chemical analyses performed by the X-ray spectroscopy and the XPS.

The subject of the present invention was illustrated by the examples.

Example 1

The acid proof austenitic steel 1H18N9T/1.4541 tube was subjected to 7 heating cycles in air. The cycles were composed of the thermo-programmed heating to 650° C. with the rate of 4°/min and the next annealing at that temperature for 4 h. The layer of the oxide catalyst, containing the phase with the spinel structure and the lattice parameters of $NiFe_2O_4$, as well as the phase isostructural with $\alpha\, Fe_2O_3$, was obtained. The percentage of the spinel phase was ca 36% and the percentage of the phase with $\alpha\, Fe_2O_3$ structure was ca 64%. The BET specific surface area of powdered catalyst scraped off the tube was equal to 4 $m^2/g$.

The Raman spectra were taken in three points of the powdered sample. The spectra in the 100-2000 $cm^{-1}$ wave number range are presented in FIG. 1. Above the maxima the position of the peaks of $\alpha\, Fe_2O_3$ (Phys. Rev. B41 (1990) 7822-7827 M. J. Massem et al.) (*), $FeCr_2O_4$ (Geochim. Cosmochim. Acta, 67 (2003) 3937-3942 M. Chen et al.) (▼), $Fe_3O_4$ (Journal of Solid State Chemistry 174 (2003) 424-430 O. N. Shebanova et al.) (●), and $NiFe_2O_4$ (J. Raman Spectrosc. (2010), (wileyonlinelibrary.com) DOI 10.1002/jrs.2791 A. Ahlawat & V. G. Sathe) (▲) are marked.

As seen, in the investigated micro-areas of the sample, scraped from the tube surface, $\alpha\text{-}Fe_2O_3$ phase and spinel phases with the lattice parameters of $NiFe_2O_4$ and/or $FeCr_2O_4$ are present. The presence of $\alpha\text{-}Fe_2O_3$ and spinel phases in his catalyst was also found by the XRD method.

Figure 2:
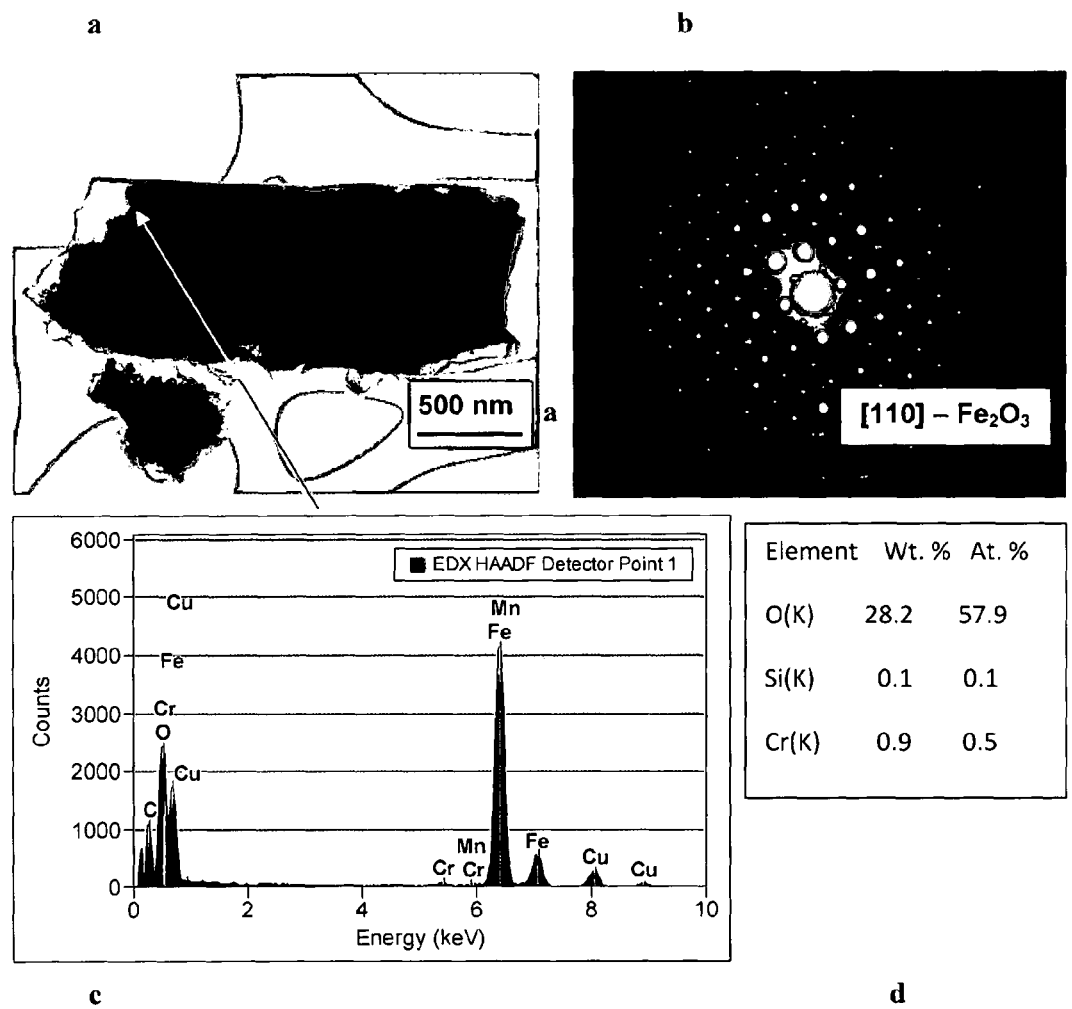
FIG. 2 shows the results of transmission electron microsocopy of a micro-crystallite obtained according to Example 1, specifically, (a) a microscopic image of the micro-crystallite; (b) a diffraction pattern from a chosen area of the micro-crystallite; (c) an x-ray spectrum from a point of the micro-crystallite show by an arrow, and (d) the contents of the elements in the analysis area shown by the arrow, in weight and atomic percent.

The results of the investigation of that catalyst by transition electron microscopy have provide more precise information about the present phases and their chemical composition. In FIG. 2 the results obtained for typical micro-crystallite, by the analytical transmission electron microscopy, are presented. FIG. 2a represents the microscopic image of the micro-crystallite. FIG. 2b shows selected area diffraction pattern from the chosen area of the micro-crystallite with marked zone of the planes, FIG. 2c represents the X-ray spectrum from the point of micro-crystallite shown by the arrow, FIG. 2d shows the contents of the particular elements in the analysis area shown by the arrow, in weight and atomic percents.

The indexing of the selected area diffraction pattern allows to find out the presence of the $\alpha\text{-}Fe_2O_3$ crystallite with (110) surface perpendicular to the electron beam. The O/Fe atomic ratio close to 1.5 confirms the presence of $Fe_2O_3$. However, the presence of Cr 0.5 at. % and close ionic radii of $Fe^{3+}$ and $Cr^{3+}$ ions show the formation of the $Cr^{3+}/\alpha\text{-}Fe_2O_3$ solid solution. The amounts of manganese and silicon found out in that crystallite are smaller.

Figure 3:
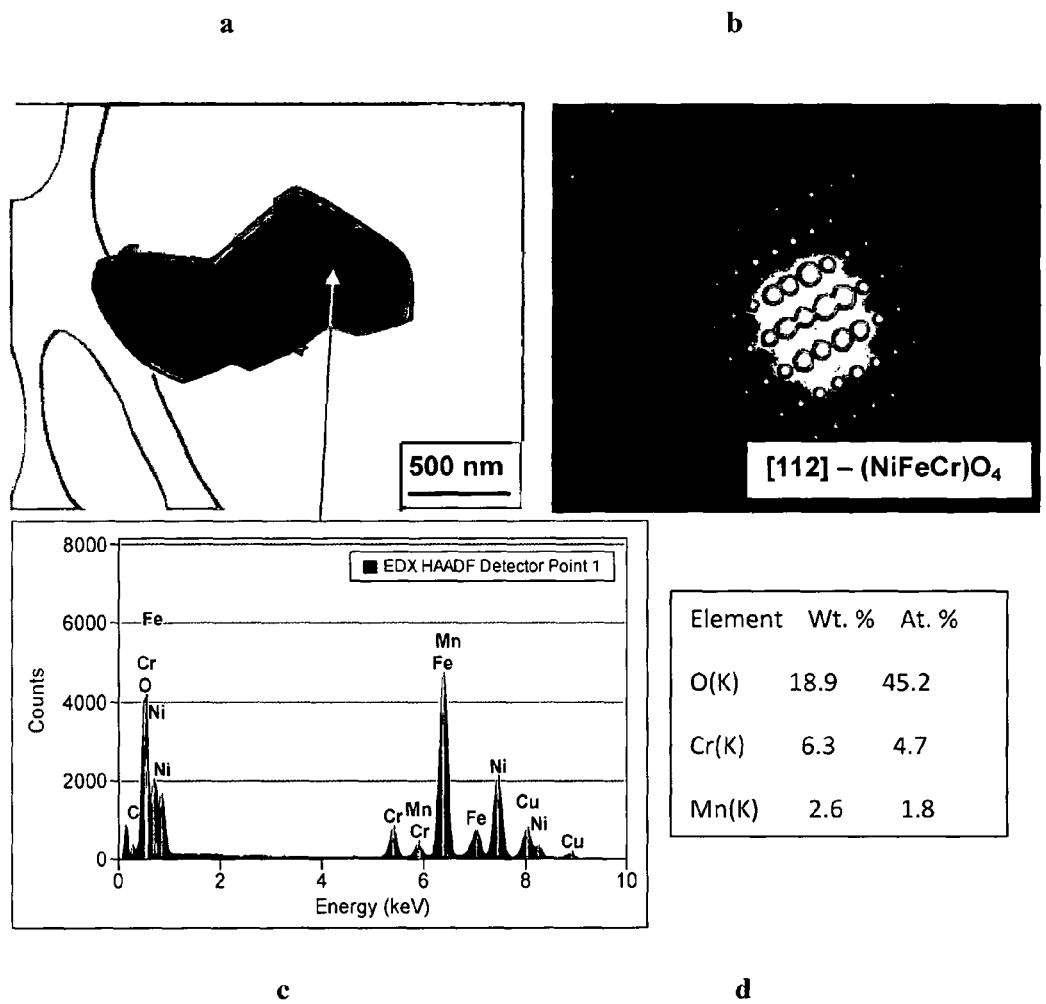
FIG. 3 shows the results of transmission electron microscopy of a second micro-crystallite obtained according to Example 1, specifically, (a) a microscopic image of the micro-crystallite; (b) a diffraction pattern from a chosen area of the micro-crystallite; (c) an x-ray spectrum from a point of the micro-crystallite shown by an arrow; and (d) the contents of the elements in the analysis area shown by the arrow, in weight and atomic percent.

In FIG. 3 the results obtained by transmition electron microscopy for another micro-crystallite of the investigated catalyst are shown. FIG. 3a presents microscopic image of the micro-crystallite. FIG. 3b represents the area diffraction pattern from the chosen part of the investigated micro-crystallite with marked zone of planes. FIG. 3c shows X-ray spectrum from the area marked by the arrow. FIG. 3d presents contents of the particular elements in the area shown by the arrow, in the weight and atomic percents.

The indexing of the selected area diffraction pattern, shown in FIG. 3b, allows to find that it comes from $NiFe_2O_4$ crystallite with (112) plane perpendicular to the electron beam. The atomic ratio of iron to nickel close to 2 (FIG. 3d) also confirms the presence of that phase.

Example 2

The 1H18N9T/1.4541 austenitic acid- proof steel tube was subjected to 7 heating cycles in air, composed of thermo programmed heating up to 840° C. with 4°/min rate followed by the annealing at that temperature for 4 hours. The oxide layer with specific surface area equal to 1 $m^2/g$, containing $\alpha\, Fe_2O_3$ and spinel phase with lattice parameters near to the lattice parameters of nickel-iron spinel, was obtained.

The surface part (up to 2 nm) of this layer is impoverished in $Cr^{3+}$ and $Fe^{2+}$ cations and enriched in $Fe^{3+}$ cations in comparison with the surface part oxide layer obtained in the heating cycles up to 650° C., as it is shown in Table 1, demonstrating the results obtained by the X-ray photoelectron spectroscopy method. However, the content of the nickel ions is practically the same in both the cases.

The lowering of the ratio of the total amount of the ions at II degree of oxidation to the total amount of the ions at III degree of oxidation in comparison to the catalyst obtained in the heating cycles up to 650° C. distinctly shows lowering of the participation of the spinel phase, that is confirm also by results of the investigation by diffraction methods and by Raman spectroscopy.

TABLE 1

Percentage of the particular cations in the surface nanolayers of the catalyst obtained in the course of 7 heating cycles up to 650 and to 840° C., determined by XPS.

| | Kind of cations | | | |
|---|---|---|---|---|
| | $Fe^{3+}$ | $Fe^{2+}$ | $Cr^{3+}$ | $Ni^{2+}$ |
| Catalyst obtained in the course of 7 heating cycles up to 650° C. in air | | | | |
| Content [at. %] | 23 | 39 | 28 | 10 |
| Catalyst obtained in the course of 7 heating cycles up to 840° C. in air | | | | |
| Content [at. %] | 42 | 28 | 21 | 9 |

Example 3

The investigation of the activity of the Cr,Mn/α-Fe$_2$O$_3$—Cr, Mn/NiFe$_2$O$_4$ biphasic catalyst, obtained according to the example 1, in the direct NO decomposition.

The investigation was performed in the quartz vertical tubular flow reactor (Ø=3.6 mm and l=31 cm) with the perforated quartz plate holding the catalyst, placed 3 cm above its bottom end as well as in the quartz vertical u-tube (Ø=3.6 mm) flow reactor with 4 times broadening in the catalyst volume, containing quartz fit holding the catalyst.

The investigations was performed in 150-500° C. temperature range for NO diluted by helium to 2%, 1% and 200 ppm with GHSV=15000 h$^{-1}$. The NO concentration equal to 200 ppm corresponds to the concentration of NO in tail-gases of numbers coal-biomass power plants. They used GHSV was ca twice higher than GHSV of the tail-gases in the power plants.

Figure 4:
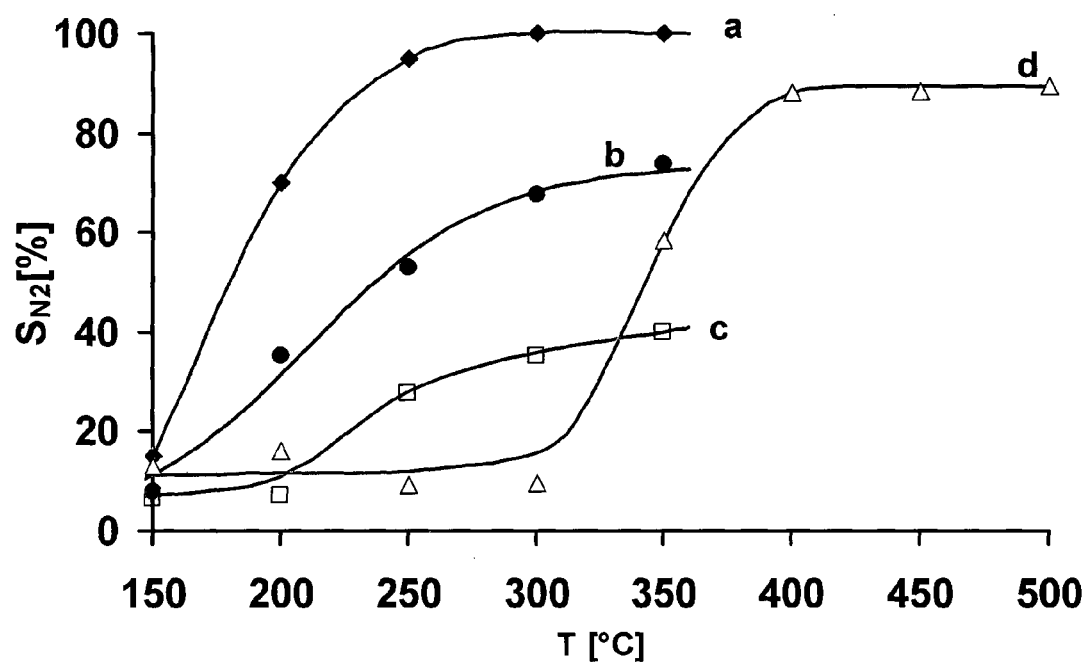
FIG. 4 shows a chart illustrating the temperature dependency of nitrogen selectivity during direct NO decomposition in the following gas mixtures: a) 2% NO/He; b) 2% NO and 7.4% $O_2$/He; c) 2% NO and 1600 ppm $SO_2$/He; and d) 2% NO, 7.4% $O_2$, 200 ppm $SO_2$ and 0.25 g of dust from biomass-coal power plant filters, according to Example 3.

In FIG. 4 the temperature dependences of the selectivity to nitrogen in the direct NO decomposition in the gas mixtures containing: a) 2/% NO/He, b) 2% NO and 7.4% O$_2$/He; c) 2% NO and 1600 ppm SO$_2$/He; d) 2% NO, 7.4% O$_2$, 200 ppm SO$_2$ and 0.25 g of the dusts gathered after electro filters in biomass-coal power plant, with s GHSV=15000 h$^{-1}$ on the 0.2 g sample of the catalyst obtained according to example 1, are presented. The NO conversion was equal to 100% at all the temperatures for the reaction mixtures containing additional components beside 2% NO/He. The NO conversion was equal to ca. 50% only at 150° C. for the reaction mixture 2% NO/He.

As easy to notice, the direct NO decomposition proceeds with the highest selectivity to nitrogen ($S_{N2}$) in the 2% NO/He gas mixture (FIG. 4a). It gains the value close to 100% already at 250° C. and stabilizes at this level at higher temperatures.

The presence of 5% of oxygen in the reaction mixture results in lowering of the value of the selectivity to nitrogen in the whole temperature range and the shift of its stabilization, at the level of ca 80%, to 400° C. (FIG. 4b).

1600 ppm of SO$_2$ causes bigger lowering of the selectivity to nitrogen than 5% of O$_2$ and causes also the lack of $S_{N2}$ stabilization in the investigated temperature range.

Simultaneous presence of 2% NO, 7.4% O$_2$, 200 ppm SO$_2$ and mixing of the catalyst with 0.5 g of the dust gathered behind the electro filters in biomass-coal power plant causes that selectivity to nitrogen at temperatures up to 300° C. remains at very low level (ca. 10%). Above 300° C. the $S_{N2}$ rapidly increases achieving at 400° C. the value ca 90%. This selectivity remains stabile also at higher temperatures. CO$_2$ was found in the products of reaction proceeding above 300° C.

The comparison of the result of the chemical analyses performed by the X-ray spectroscopy method for the freshly prepared sample of the catalyst mixed with the dust as well as for the sample of this catalyst used in the reaction of the direct NO decomposition shows diminishing of the carbon content in the course the catalyst interaction with the reaction mixture.

It could be thus claimed that above 300° C. the catalyst according to the invention may be used for simultaneous removal of NO and carbon particles from tail-gases of such sources of emission as power plants, heat and power plants, nitric acid factories, waste incinerators, boilers of the low and medium power or Diesel engines, containing noticeable amount of oxygen and possibly also the amounts of sulphur dioxide comparable with those of NO.

The invention claimed is:

1. A catalytic composition for the direct decomposition of NO to N$_2$ and O$_2$, comprising:
   a) an austenitic acid proof steel substrate containing no more than: 0.1 wt. % of C; 2.0 wt. % of Mn; 0.8 wt. % of Si; 0.045 wt. % of P; 0.03 wt. % of S; 0.3 wt. % of Cu; 19.0 wt. % of Cr; 10.0 wt. % of Ni and 0.8 wt. % of Ti; and
   b) a biphasic oxide outer layer on the austenitic acid proof steel substrate, having 64-72 wt. % of a first phase and 28%-36% of a second phase,
   wherein the first phase of the biphasic oxide outer layer has an αFe$_2$O$_3$ crystal structure and micro crystallites containing 0.1-1.7 at. % of Cr, 0.1-0.3 at. % of Mn and 0-0.2 at. % of Si, and
   wherein the second phase of the biphasic oxide outer layer has a spinel crystal structure with lattice parameters substantially similar to NiFe$_2$O$_4$, and micro crystallites containing 3.6-8.8 at. % Cr and 1.4-3.4 at. % of Mn.

2. The catalytic composition of claim 1, wherein:
   no more than 1.5% of the Fe$^{3+}$ ions are substituted by Cr$^{3+}$ ions in the first phase; and
   no more than 12% of the Fe$^{3+}$ ions are substituted by Cr$^{3+}$ ions and no more than 10% of the Ni$^{2+}$ ions are substituted by Mn$^{2+}$ ions in the second phase.

3. The catalytic composition of claim 1, wherein the austenitic acid proof steel substrate is nickel steel.

4. The catalytic composition of claim 1, wherein the austenitic acid proof steel substrate contains titanium.

5. The catalytic composition of claim 1, wherein the austenitic acid proof steel substrate is 1H18N9T/1.4541 steel.

6. The catalytic composition of claim 1, wherein the austenitic acid proof steel substrate is in the form of tubes, pieces of foil or monoliths manufactured from foil.

7. The catalytic composition of claim 1, which has a specific surface area of 1 to 5 m$^2$/g.

8. A process of producing a catalytic composition for the direct decomposition of NO to N$_2$ and O$_2$, comprising subjecting an austenitic acid proof steel substrate to at least two heating cycles in an atmosphere containing oxygen, the heating cycles comprising:
   a) heating the austenitic acid proof steel substrate to 600-850° C. at rate of 2-6° C./min, and
   b) annealing the austenitic acid proof steel substrate at 600-850° C. for 2-6 hours;
   wherein the austenitic acid proof steel substrate contains no more than: 0.1 wt. % of C; 2.0 wt. % of Mn; 0.8 wt. % of Si; 0.045 wt. % of P; 0.03 wt. % of S; 0.3 wt. % of Cu; 19.0 wt. % of Cr; 10.0 wt. % of Ni and 0.8 wt. % of Ti.

9. The process of claim 8, wherein the atmosphere containing oxygen is air.

10. The process of claim 8, wherein the austenitic acid proof steel substrate is chromium-nickel steel.

11. The process of claim 8, wherein the austenitic acid proof steel substrate is 1H18N9T/1.4541 steel.

12. The process of claim 8, comprising subjecting the austenitic acid proof steel substrate to 2-10 heating cycles.

13. The process of claim 8, wherein the austenitic acid proof steel substrate is in the form of tubes, pieces of foil or monoliths manufactured from foil.

* * * * *